United States Patent [19]
Takeuchi et al.

[11] Patent Number: 6,054,202
[45] Date of Patent: Apr. 25, 2000

[54] WIPING SHEET AND PRODUCTION THEREOF

[75] Inventors: Naohito Takeuchi; Nariaki Shimoe; Daisuke Yamada, all of Kagawa, Japan

[73] Assignee: Uni-Charm Corporation, Ehime, Japan

[21] Appl. No.: 09/034,730

[22] Filed: Mar. 4, 1998

[30] Foreign Application Priority Data

Mar. 7, 1997 [JP] Japan ......................... 9-52959

[51] Int. Cl.[7] ......................................... B32B 5/08
[52] U.S. Cl. ..................... 428/167; 442/361; 442/381; 442/382; 442/391; 442/401; 428/198
[58] Field of Search ..................... 442/361, 381, 442/382, 391, 401; 428/167, 198

[56] References Cited

U.S. PATENT DOCUMENTS 3,507,943  4/1970  Such et al. .
4,623,575  11/1986  Brooks et al. .

FOREIGN PATENT DOCUMENTS 002070039  2/1994  Japan .
002070040  2/1994  Japan .
6-038895    2/1994  Japan .
9-067748    3/1997  Japan .
2031039     4/1980  United Kingdom .

*Primary Examiner*—Richard Weisberger
*Attorney, Agent, or Firm*—Koda & Androlia

[57] ABSTRACT

Disclosed herein is a wiping sheet composed of two pieces of spunlace nonwoven fabrics containing heat-shrinkable fiber which are fusion-bonded together with fusion-bonding lines which extend in the cross direction perpendicular to the machine direction. The fusion-bonding lines are formed such that their pitch in the machine direction is shorter than one half of the fiber length so that each fusion-bonding line intersects a single fiber at 3 or more points. This structure prevents surface fluffing and imparts a high surface frictional strength and a high bending resistance for comfortable wiping work.

12 Claims, 4 Drawing Sheets

WIPING SHEET AND PRODUCTION THEREOF

BACKGROUND OF THE INVENTION

1. Field of the Invention

The present invention relates to a wiping sheet and a process for production thereof, and more particularly to a wiping sheet to be used, in a wet or dry state with or without a chemical solution impregnated thereinto, to wipe out dirt in the kitchen.

2. Description of the Prior Art

Wiping sheet widely used in the past to wipe out dirt in the kitchen is embossed two-ply water-proof paper or nonwoven fabric (called spunlace formed by interlacing fibers), both impregnated with a chemical solution. The chemical solution used for such wiping sheet is composed of alcohol, surfactant, and glycol, so that it easily decomposes oily dirt.

The wiping sheet to be used to wipe out dirt in the kitchen should meet the following conditions.

(a) High bending resistance. Without sufficient bending resistance, the wiping sheet tends to twist or roll during wiping.

(b) High surface frictional strength, which is defined as the number of times required for the sheet to break after rubbing against the surface under a prescribed load.

Without sufficient frictional strength, the wiping sheet tends to fluff and break during wiping.

(c) Specific surface structure suitable for wiping. This is necessary for effective wiping.

(d) Apparent large thickness. A thin wiping sheet is difficult to hold by hand and feels harsh during wiping.

Conventional embossed two-ply water-proof paper as kitchen wiping sheet does not meet all the above-mentioned requirements. It may have its bending resistance in condition (a) increased to some extent. It may have its apparent thickness in condition (d) increased to some extent by embossing and plying. However, it is very poor in surface frictional strength in condition (b) and hence it is liable to break during strong wiping. Also, it has a high surface density contrary to condition (c) and hence is less effective than fiber-interlaced nonwoven fabric.

On the other hand, conventional wiping sheet in the form of fiber-interlaced nonwoven fabric impregnated with a chemical solution does not meet all the above-mentioned requirements either. It may have its thickness in condition (d) increased by increasing its basis weight. It has a surface structure in condition (c) more suitable for wiping than paper, but it is liable to fluffing because it is composed of fibers which are merely interlaced but are not firmly bonded to one another. After several repetitions of wiping, it breaks due to surface fluffing. This is true particularly in the case where it is rubbed against a gas range with charred dirt. In other words, it is also poor in surface frictional strength in condition (b) and hence is poor in wiping performance. Moreover, it is low in bending resistance contrary to condition (a) and hence it is liable to twist and roll during wiping.

As mentioned above, none of conventional wiping sheets meet all the above-mentioned conditions (a),(b),(c) and (d).

SUMMARY OF THE INVENTION

The present invention was completed in order to address the above-mentioned problems involved in the prior art technology. It is an object of the present invention to provide a wiping sheet and a process for production thereof, said wiping sheet utilizing the surface structure of fiber-interlaced nonwoven fabric which is suitable for wiping and also having a high bending resistance and an improved frictional strength necessary for good durability and wiping performance.

It is another object of the present invention to provide a nonwoven fabric and a process for production thereof, said nonwoven fabric having a specific surface structure for effective wiping.

The wiping sheet of the present invention comprises at least one nonwoven fabric formed by interlacing fibers containing at least thermoplastic fibers, said fibers being oriented more in the machine direction but less in the cross direction, said thermoplastic fibers being fusion-bonded such that the fusion-bonding lines extend forming a strip ed pattern in the direction intersecting the machine direction, said striped pattern having a pitch (in the machine direction) shorter than the substantial length of the fiber forming the nonwoven fabric.

The above-mentioned fiber-interlaced nonwoven fabric has a higher tensile strength in the machine direction (in which more fibers are oriented) than in the cross direction (in which less fibers are oriented). The machine direction (MD) is that direction in which the web advances when it is formed from fibers. The cross direction (CD) is that direction perpendicular to the machine direction.

The above-mentioned tensile strength is defined as the tensile strength at break measured when a specimen (25 mm wide) is pulled at a rate of 100 mm/min using a Tensilon.

The nonwoven fabric suitable for the present invention is the fiber-interlaced nonwoven fabric (so-called spunlace nonwoven fabric) which is characterized by that the ratio of tensile strength in the machine direction to that In the cross direction is from 1.5:1 to 10:1.

The wiping sheet of the present invention utilizes the fact that the fiber-interlaced nonwoven fabric has a surface structure suitable for wiping. The swiping sheet of the present invention may consist of one piece of the nonwoven fabric or more (preferably two) pieces of the nonwoven fabric stacked on top of the other. The feature of the present invention resides in the fusion-bonding lines extending in the direction intersecting the machine direction (MD) in a striped pattern, which can be formed by fusion-bonding the thermoplastic fibers contained in nonwoven fabric. Additionally, when the wiping sheet consists of a plurality of nonwoven fabrics, the fusion-bonding lines can fusion-bond a plurality of nonwoven fabrics to each other. The fusion-bonding lines in a striped pattern produce a high bending resistance which is not obtained by an ordinary simple nonwoven fabric. In other words, the above-mentioned condition (a) can be met in this way. In addition, the fusion-bonding lines extending in the cross direction (CD) contribute to the tensile strength in the cross direction of the wiping sheet. The striped pattern has a pitch (in MD) shorter than the substantial length of the fiber forming the nonwoven fabric. This construction prevents surface fluffing, thereby improving the surface frictional strength of the wiping sheet. In this way the above-mentioned condition (b) can be met.

Laying two or more pieces of nonwoven fabrics on top of the other increases the apparent thickness, thereby meeting the above-mentioned condition (d). In the case where the wiping sheet consists of a single piece of nonwoven fabric, the nonwoven fabric should have a basis weight greater than 50 g/m$^2$, so that it is thick enough to meet the above-mentioned condition (d).

The above-mentioned fusion-bonding lines should preferably extend in the direction oblique to both the machine and cross directions. To be more specific, the fusion-bonding lines should be of wavy or herringbone pattern.

The fusion-bonding lines form raised parts of fibers at their borders with non-fusion-bonded areas. These raised parts enhance the wiping effect, thereby meeting the above-mentioned condition (c). In addition, these raised parts run in different directions because the fusion boding lines are oblique to both the machine and cross directions; therefore, they enhance the wiping effect regardless of the wiping direction.

The fusion-bonding lines should preferably be formed such that their pitch in the machine direction is shorter than one half and longer than one-eighth of the substantial fiber length. If the nonwoven fabric is composed of non-thermoplastic fibers and thermoplastic fibers which differ in the fiber length, then the substantial fiber length comes into the shorter fiber length or the fiber length of non-thermoplastic fibers. If the nonwoven fabric is composed of fibers with various fiber lengths, the substantial fiber length comes into the shortest fiber length.

The nonwoven fabric should preferably contain heat-shrinkable fibers. In other words, the nonwoven fabric should preferably be composed of heat-shrinkable thermoplastic fibers and non-thermoplastic fibers (such as rayon). Alternatively, it should preferably be composed of heat-shrinkable thermoplastic fibers, non-heat-shrinkable thermoplastic fibers (such as PET), and rayon fibers. It may also be composed of heat-shrinkable thermoplastic fibers and non-heat-shrinkable thermoplastic fibers (such as PET).

The heat-shrinkable fibers produce small wrinkles on the surface of the nonwoven fabric in the shrinking step, and such wrinkles enhance the wiping effect.

The heat-shrinkable fibers should preferably be composite fibers of side-by-side type formed from resins differing in melting point. Such composite fibers shrink to take on the spiral or wavy shape, thereby producing minute irregularities on the sheet surface. These surface irregularities enhance the wiping effect.

If the wiping sheet is composed of a single nonwoven fabric, then the nonwoven fabric should preferably have a basis weight greater than 50 g/m$^2$ and less than 100 g/m$^2$. If the wiping sheet is composed of two or more nonwoven fabrics, then the nonwoven fabrics should preferably have a total basis weight greater than 50 g/m$^2$ and less than 100 g/m$^2$. The specified basis weight greater than 50 g/m$^2$ contributes to the surface frictional strength and thickness of the wiping sheet.

According to the present invention, the process for producing the wiping sheet comprises the steps of forming a web containing heat-shrinkable fibers, interlacing the fibers constituting the web, shrinking said heat-shrinkable fibers in the web, and heat-fusing thermoplastic fibers in the web using a heating roll, thereby forming fusion-bonding lines in a striped pattern such that the fusion-bonding lines extend crossing the machine direction and the striped pattern has a pitch in the machine direction which is shorter than the substantial length of the fibers constituting the nonwoven fabric, with the direction in which more fibers constituting the nonwoven fabric are oriented being defined as the machine direction and the direction (perpendicular to the machined direction) in which less fibers constituting the nonwoven fabric are oriented being defined as the cross direction.

In the case where the wiping sheet is composed of two or more nonwoven fabrics, the above-mentioned process comprises an additional step of laying nonwoven fabrics one over another between the shrinking step and the heat-fusing step, so that the nonwoven fabrics are joined together by the fusion-bonding lines in the heat-fusing step.

The fusion-bonding lines to join nonwoven fabrics together should preferably be formed in a wavy or herringbone pattern.

DESCRIPTION OF THE PREFERRED EMBODIMENTS

Figure 1:
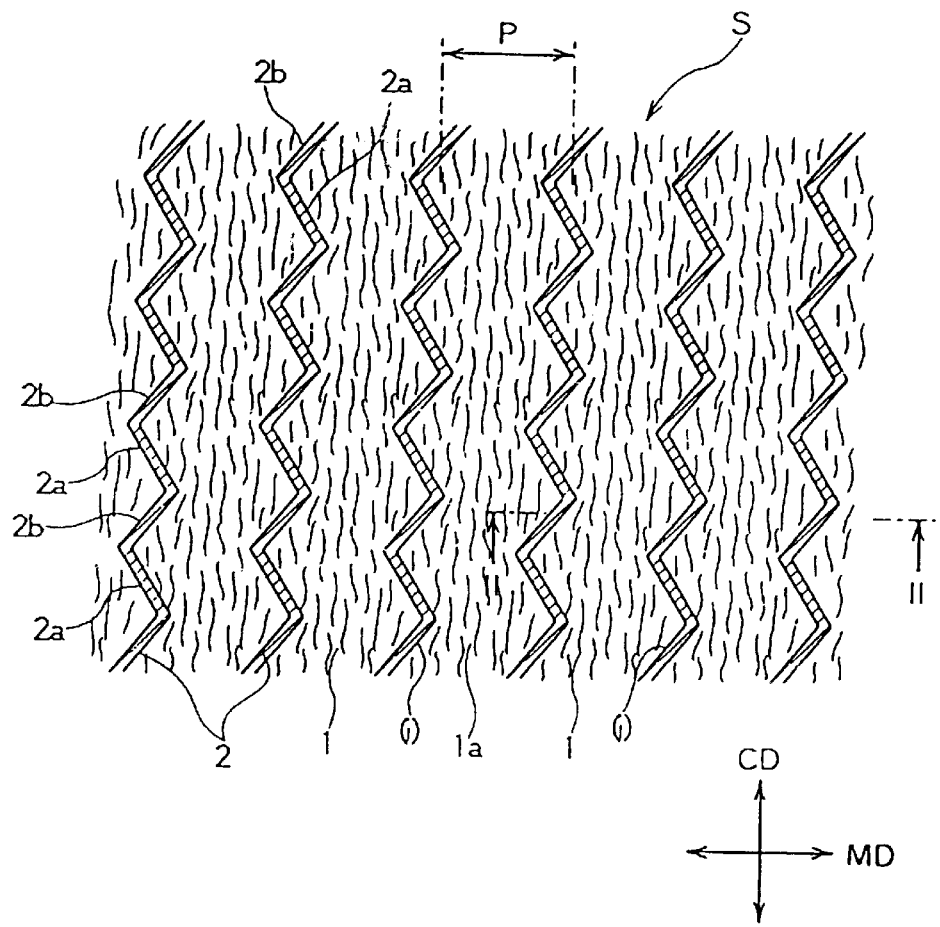
FIG. 1 is a schematic plan view showing the surface configuration of the wiping sheet of the present invention.
Figure 2:
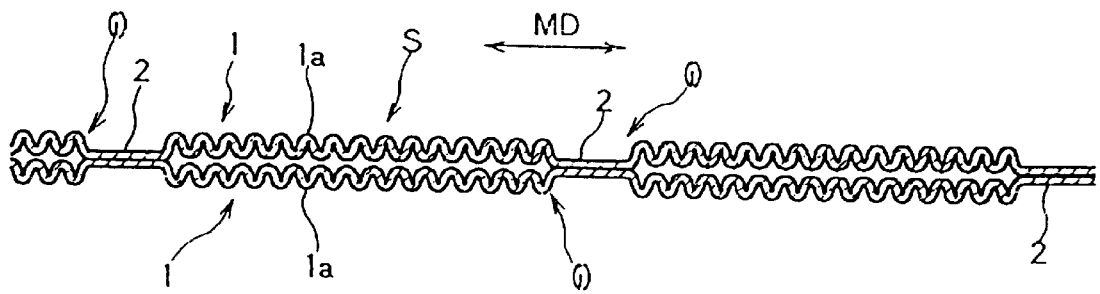
FIG. 2 is an enlarged sectional view taken along the line II—II in FIG. 1.

The wiping sheet of the present invention has the surface configuration as schematically shown in FIG. 1 (plan view) and also has the cross section as shown in FIG. 2 (enlarged sectional view taken along the line II—II in FIG. 1). It is produced by the steps schematically shown in FIG. 3(A) to FIG. 3(C).

The wiping sheet S in FIGS. 1 and 2 is composed of two pieces of nonwoven fabrics 1 and 1 which are laid on top of the other and fusion-bonded together at the fusion-bonding lines 2.

The nonwoven fabric 1 is a fiber-interlaced nonwoven fabric called spunlace. It is composed of rayon fibers and heat-shrinkable thermoplastic fibers. The term "heat-shrinkable fibers" is meant any fiber which has undergone drawing in the manufacturing process so that they shrink upon heating in proportion to the ratio of drawing. The heat-shrinkable thermoplastic fiber is a composite fiber of side-by-side type composed of materials differing in melting point. The combination of materials is, for example, low-melting polyester/high-melting polyester, low-melting polypropylene/high-melting polypropylene, and polypropylene/polyethylene.

After being drawn and oriented in the machine direction, the composite fiber (of side-by-side type) shrinks upon heating in the machine direction, particularly in side-by-side type to take on a spiral or wavy shape. This shrinking produces minute surface iregularities on the wiping sheet.

The nonwoven fabric 1 is not restricted in structure to the one explained above. It may be composed of rayon fiber, heat-shrinkable thermoplastic fiber, and non-heat-shrinkable thermoplastic fiber. Alternatively, it may be composed of rayon fiber and non-heat-shrinkable thermoplastic fiber.

The preferred blending ratio of fibers is as follows.

rayon fiber:thermoplastic fiber=30–70:70–30 (wt %)

rayon fiber:heat-shrinkable fiber=30–70:70–30 (wt %)

rayon fiber:thermoplastic fiber:heat-shrinkable fiber= 30–60:10–30:10–60 (wt %)

The nonwoven fabric 1 which has undergone the shrink process is shown in FIGS. 1 and 2. It is noted that the heat-shrinkable fibers shrink in the machine direction in which more fibers are oriented, thereby forming minute wrinkles (1a,1a, . . . ) extending randomly in the cross direction.

The two nonwoven fabrics (1, 1) are heated under pressure at the fusion-bonding lines (2, 2), so that they are fusion-bonded together by the heat-shrunk thermoplastic fibers (composite fiber of side-by-side type).

The fusion-bonding lines (2,2, . . . ) extend, forming a striped pattern, in the direction approximately perpendicular to the machine direction in which more fibers are oriented. The fusion-bonding lines (2,2, . . . ) retain fibers, thereby preventing the surface fluffing and breaking. Moreover, the fusion-bonding lines in a striped pattern increases the bending resistance of the wiping sheet S, thereby preventing the wiping sheet from twisting and rolling during wiping. The fusion-bonding lines in a striped pattern extending in the cross direction prevent the wiping sheet from elongating in the cross direction, thereby increasing the strength of the wiping sheet. This is desirable because fiber-interlaced nonwoven fabrics are usually low in tensile strength in the cross direction than in the machine direction in which more fibers are oriented. In fact, the ratio of tensile strength in the machine direction to that in the cross direction is from 1.5:1 to 10:1.

The fusion-bonding lines (2,2, . . . )take on a saw-toothed or herringbone pattern, as shown in FIG. 1. They extend obliquely to both the machine direction and the cross direction of the nonwoven fabric (1, 1), as indicated by 2a and 2b.

The wiping sheet of the present invention comes in two types. One is a wet sheet Impregnated with a chemical solution composed of alcohol, surfactant, and glycol, and another is a dry sheet not impregnate with a chemical solution. The former is suitable for cleaning the kitchen gas range, and the latter is suitable for cleaning the floor and furniture, with or without impregnation with water.

The fiber-interlaced nonwoven fabrics (1,1) inherently have the surface suitable for removing dirt. Their cleaning effect is enhanced by the randomly formed minute surface wrinkles (1a) because they contain heat-shrunk fibers. In addition, the fusion-bonding lines (2,2, . . . ) are formed such that the fiber of the nonwoven fabric is raised at their border (i) with the non-fusion-bonding area, and hence this border (i) produces the effect of scraping off dirt. This effect is independent of the wiping direction because the fusion-bonding line (2,2, . . . ) take on the herringbone pattern and the oblique parts (2a, 2b) are oblique to both the machine and cross directions.

Incidentally, it is not always necessary that the nonwoven fabrics (1,1) contain heat-shrinkable fiber; they may be composed of rayon and polyester fiber (such as polyethylene terephthalate (PET) as thermoplastic fiber). In this case, the wrinkles (1a) due to heat-shrunk fibers are not formed; however, the resulting nonwoven fabrics (1,1) will have a surface suitable for cleaning dirt if they have an adequate basis weight.

The nonwoven fabric is constructed of thermoplastic fibers which are fusion-bonded at the fusion-bonding lines. However, non-thermoplastic fibers (such as rayon) are not fusion-bonded and hence are liable to peeling from the sheet surface. Therefore, it is desirable that the fusion-bonding lines be formed such that its pitch in the machine direction is shorter than the length of non-thermoplastic fibers.

The wiping sheet of the present invention may be based on a nonwoven fabric composed of thermoplastic fibers (such as PP and PE), non-thermoplastic fibers (such as rayon), and short fiber (such as pulp). In this case, the fusion-bonding lines should be formed such that their pitch in the machine direction is shorter than the length of the non-thermoplastic fiber or rayon, whichever shorter.

In the present invention, the fiber length means the average fiber length in each kind of fibers, so that when the nonwoven fabric is formed by interlacing several kinds of fibers, the substantial fiber length means the shortest fiber length among said several kinds of fibers, excluding the pulp. In the case where the nonwoven fabric is composed of thermoplastic fibers and non-thermoplastic fibers, the substantial fiber length may also mean the shorter fiber length of these fibers. In addition, in the case of nonwoven fabric containing crimped fibers, the fiber length of crimped fiber means the average fiber length in the crimped state. In the case of nonwoven fabric containing heat-shrinkable fibers, the fiber length of heat-shrinkable fiber means the average fiber length after being heat-shrunk.

For example, if the nonwoven fabric contains rayon whose substantial fiber length is 38 mm, the fusion-bonding lines should preferably have a pitch (in the machined direction) greater than 4.5 mm and smaller than 19 mm. Fiber-interlaced nonwoven fabric usually has a substantial fiber length of 29–70 mm. In this case, the fusion-bonding lines have a pitch ranging from about 3.6 to 35 mm. In the case where the nonwoven fabric contains extremely short fibers (such as pulp), the pitch of the fusion-bonding lines should be determined on the basis of the substantial fiber length excluding pulp.

The fusion-bonding lines specified as above for their direction and pitch count three to eight (on average) per the substantial fiber length, so that they hold down fibers on the sheet surface and prevent fluffing (which leads to an enhanced surface frictional strength). Particularly, if three to eight fusion-bonding lines intersect per the fiber length other than thermoplastic fiber, they prevent non-fusion-bonded fibers from fluffing. If the number of intersecting fusion-bonding lines is two or less per the substantial fiber length, the nonwoven fabric is liable to fluffing. If the number of intersecting fusion-bonding lines is nine or above per the substantial fiber length, the fusion-bonding parts account for a large surface area, decreasing the nonwoven fabric's effective surface area and hence decreasing the wiping effect.

A process explained below is applied to the production of a wiping sheet composed of nonwoven fabrics containing heat-shrinkable fibers as shown in FIGS. 1 and 2.

Figure 3A:
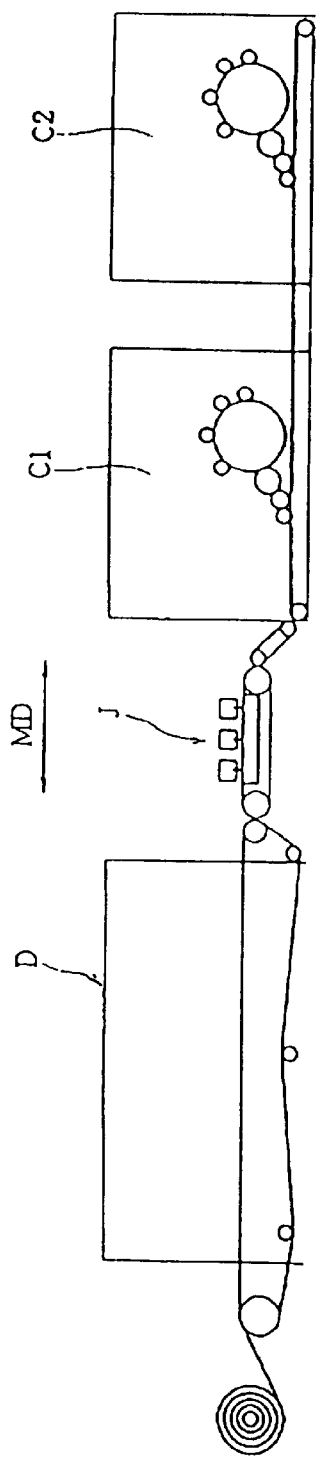
FIG. 3(A) to FIG. 3(C) is a diagram illustrating the steps of producing the wiping sheet of the present invention.
Figure 3B:
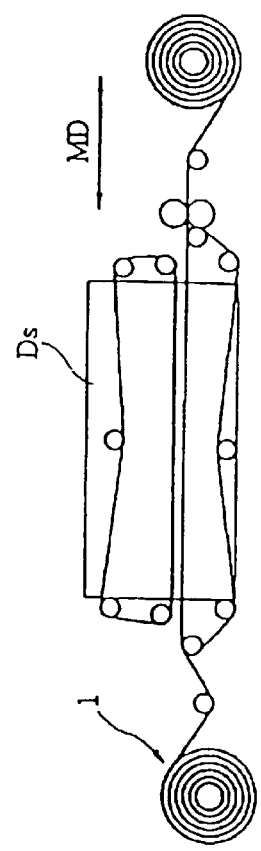
Figure 3C:
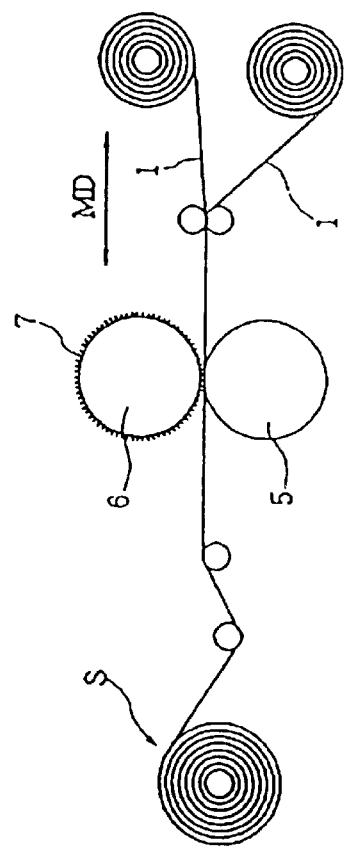

FIG. 3(A) shows an apparatus for producing a known fiber-interlaced nonwoven fabric. FIG. 3(B) shows a known shrink step. FIG. 3(C) shows a step of forming the fusion-bonding lines (2,2, . . . ).

The apparatuses in FIG. 3(A) and FIG. 3(B) may be arranged either off-line or in-line.

The apparatus shown in FIG. 3(A) for producing a fiber-interlaced nonwoven fabric has a first carding machine C1 and a second carding machine C2, which supply respectively rayon fiber (38 mm long and 1.5 denier) and PP/PP composite fiber of side-by-side type (45 mm long and 2 denier). The resulting web undergoes mechanical interlacing by water jets (J) and dried by the dryer (D).

In the subsequent shrink step shown in FIG. 3(B), the web is exposed to hot air from the shrink drier (Ds), so that the heat-shrinkable fibers are shrunk. Thus there is obtained the nonwoven fabric 1 which has wrinkles 1a as shown in FIG. 2.

Two sheets of the nonwoven fabrics (1, 1) are pressed between a smooth heating roll 5 and a hot embossing roll 6, as shown in FIG. 3(C), so that they are fusion-bonded together and the fusion-bonding lines (2,2, . . . ) are formed after the emboss pattern 7.

Figure 4A:
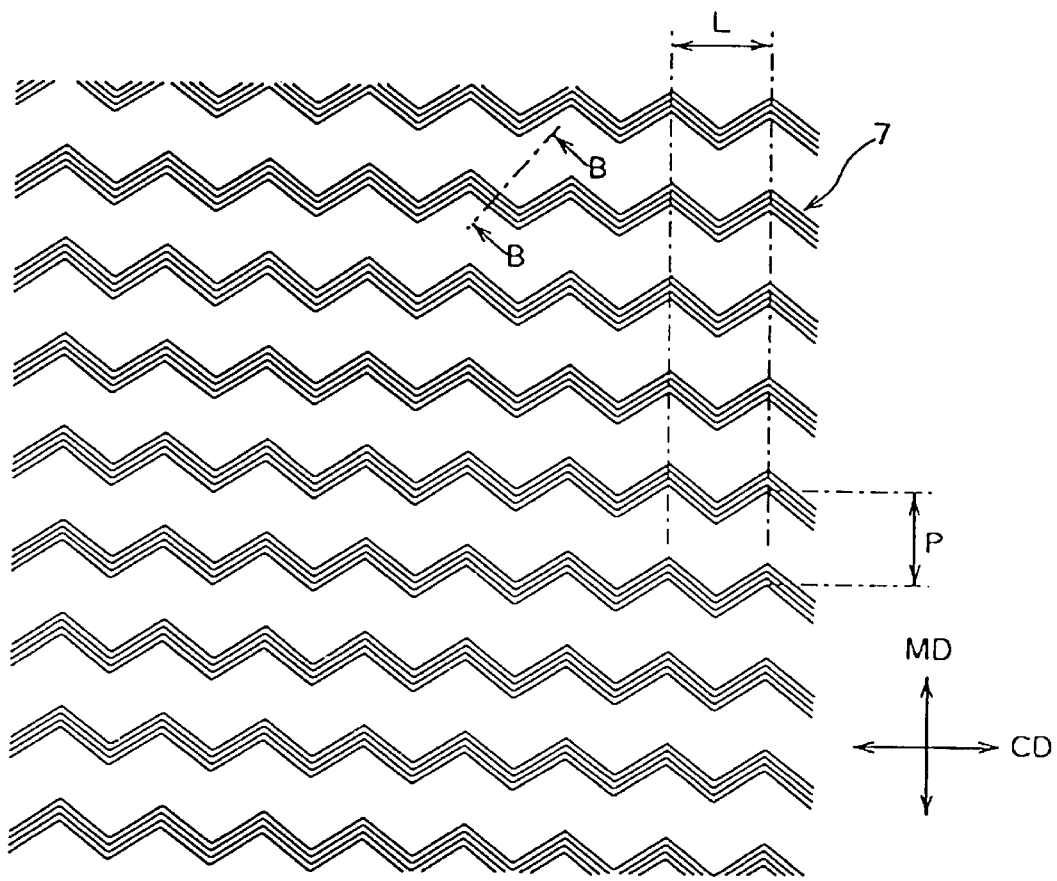
FIG. 4(A) is a development plan view showing the emboss pattern on the heat-embossing roll.

FIG. 4(A) is a development plan view showing the emboss pattern 7 on the hot embossing roll 6. It is this emboss pattern 7 that is transferred to form the fusion-bonding lines (2,2, . . . ) of the wiping sheet shown in FIG. 1.

Figure 4B:
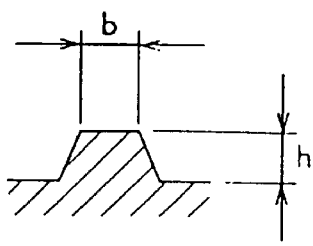
FIG. 4(B) is an enlarged sectional view taken along the line B—B in FIG. 4(A).

The emboss pattern 7 on the hot embossing roll 6 has a trapezoidal cross section as shown in FIG. 4(B). The upper base b is 0.5–2 mm, preferably 1 mm, and the height h is 0.5–1.5 mm, preferably 1 mm. As shown in FIG. 4(A), the emboss pattern 7 continuously extends in the cross direction in a striped pattern as a whole. Individual emboss patterns resembles the herringbone pattern. The pitch L (between adjacent teeth) in the cross direction is 5–12 mm, preferably 9 mm.

The pitch P in the machine direction is 7–15 mm, preferably 9.2 mm. Therefore, when transferred, the emboss pattern 7 gives the fusion-bonding lines (2,2, . . . ) which have a seal width of 0.5–2 mm and a pitch P of 7–15 mm in the machine direction.

The rayon fiber constituting the nonwoven fabric 1 is 38–51 mm long, say 38 mm long as mentioned above. The composite fiber (of side-by-side type) before shrinking is 38–76 mm long, say 45 mm long as mentioned above. The fusion-bonding lines (2,2, . . . ) are formed on the nonwoven fabric 1 after said composite fiber has heat-shrunk. The heat-shrinkage is about 30%, and the substantial fiber length of the composite fiber after shrinking is 26–55 mm.

The above-mentioned fusion-bonding lines (2,2, . . . ) are formed on the nonwoven fabrics (1,1) after heating and shrinking such that they intersect both one rayon fiber and one composite fiber extending in the machine direction at five points (on average).

The fusion-bonding lines (2,2, . . . ) intersecting each fiber at five points (on average) hold fibers on the sheet surface and prevents the sheet surface from fluffing, which imparts a high frictional strength to the sheet surface. The rayon fibers are not fused by heating; but each rayon fiber is held by the fusion-bonding lines (2,2, . . . ) at five points. This prevents fluffing and increases the surface frictional strength. The fusion-bonding lines (2,2, . . . ) have a width of 0.5–2 mm, which is equal to the upper base b of the emboss pattern 7 shown in FIG. 4(B), and also have a pitch P of 5–12 mm. That is, the fusion-bonding lines (2,2, . . . ) do not account for a large surface area. Therefore, they have no adverse effect on the wiping performance of the non-woven fabrics (1,1). Moreover, the fusion-bonding lines (2,2, . . . ) for the nonwoven fabrics (1,1) increase the bending resistance of the wiping sheet S as a whole.

Figure 5A:
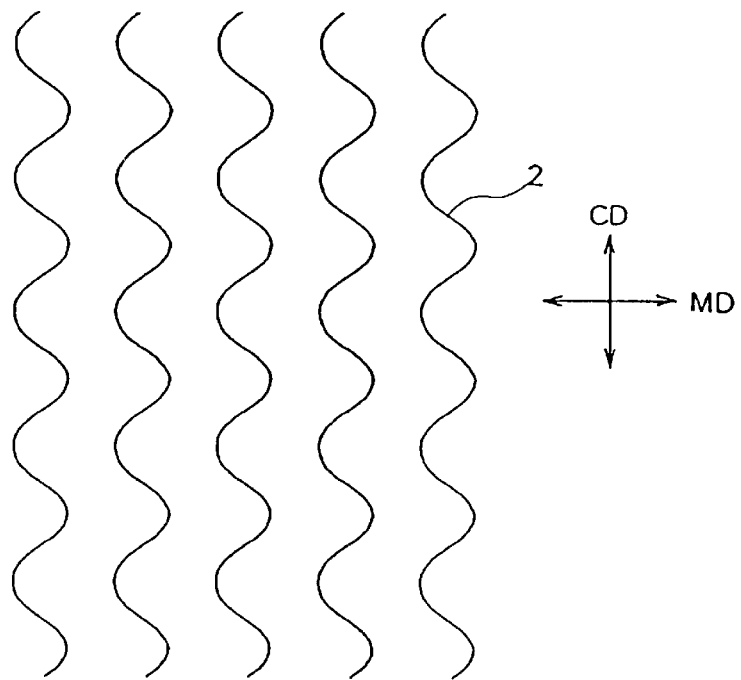
FIG. 5(A) and FIG. 5(B) is a plan view showing some patterns of fusion-bonding lines.
Figure 5B:
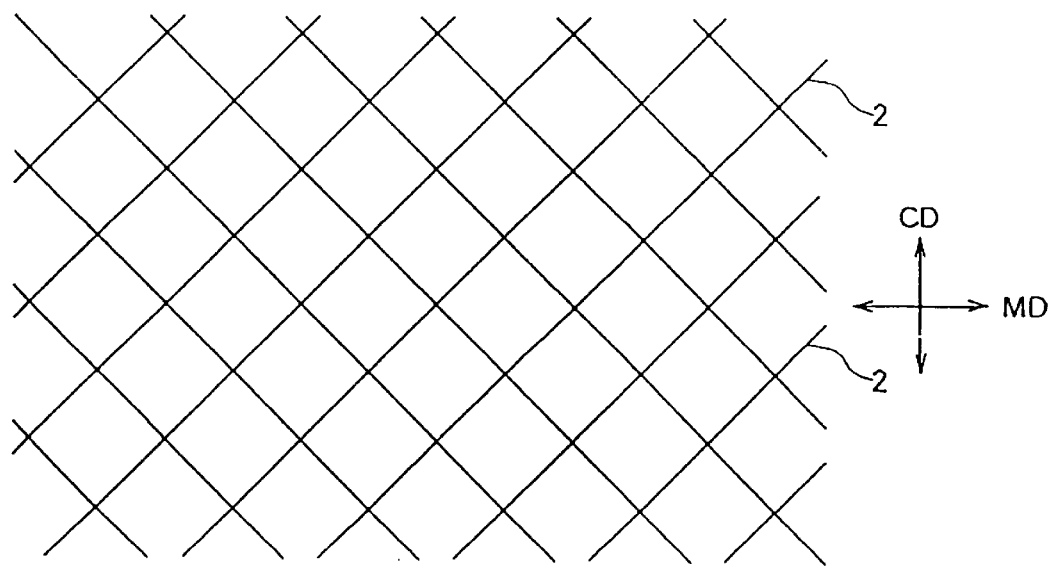

The fusion-bonding lines (2,2, . . . ) may take on a wavy pattern extending in the cross direction, as shown in FIG. 5(A), or a crossing linear pattern extending obliquely to both the machine and cross directions, as shown in FIG. 5(B).

PREFERRED EMBODIMENTS

Embodiment 1

(Raw materials)

Rayon fibers, 1.5 d, 38 mm long.

PP/PP composite fibers (of side-by-side type), 2 d, 45 mm long, as heat-shrinkable thermoplastic fiber. ("EP" from Chisso Corporation)

These two kinds of fibers were used in a blending ratio of 70/30 by weight.

(Production of nonwoven fabric)

The above-mentioned fibers were made into a web and mechanically interlaced by water jets by using the apparatus shown in FIG. 3(A). Thus there was obtained a fiber-interlaced nonwoven fabric having a basis weight of 40 g/m$^2$.

The nonwoven fabric was heated for shrinking in the step as shown in FIG. 3(B), so that the composite fiber of side-by-side type shrank about 30 wt %. Thus there was obtained the nonwoven fabric 1 having minute wrinkles 1a as shown in FIG. 2.

(Production of wiping sheet)

Two pieces of the nonwoven fabrics laid on top of the other were pressed between a heating roll 5 and a hot embossing roll 6 in the fusion-bonding step as shown in FIG. 3(C), so that the embossing pattern 7 is transferred to form the fusion-bonding lines (2,2, . . . ). The embossing pattern 7 is shown in FIGS. 4(A) and 4(B). It is specified by an upper base b of 1 mm, a height h of 1 mm, a pitch of 9.2 mm in the machine direction, and a tooth-to-tooth pitch L of 9 mm.

This pressing operation was carried out at a roll surface temperature of 130° C. under a pressure of 30 kg/cm$^2$ at a feed rate of 20 m/min.

Embodiment 2

The same procedure as in Embodiment 1 was repeated except that the fiber-interlaced nonwoven fabric had a basis weight of 25 g/m$^2$.

Embodiment 3

The same procedure as in Embodiment 1 was repeated except that the fiber-interlaced nonwoven fabric had a basis weight of 50 g/m$^2$.

Embodiment 4

(Raw materials)

Rayon fibers, 1.5 d, 38 mm long.

Polyethylene terephthalate (PET) fiber, 1.4 d, 44 mm long. These two kinds of fibers were used in a blending ratio of 70/30 by weight.

(Production of nonwoven fabric)

The above-mentioned fibers were made into a fiber-interlaced nonwoven fabric having a basis weight of 40 g/m$^2$, in the same manner as in above-mentioned Embodiments by using the step shown in FIG. 3(A).

(Production of wiping sheet)

Two pieces of the nonwoven fabrics laid on top of the other were pressed by the fusion-bonding step shown in FIG. 3(C) under the same condition as Embodiment 1, so that fusion-bonding lines (2,2, . . . ) were formed thereon.

Comparative Example 1

Water-proof paper (pulp 100%) having a basis weight of 40 g/m$^2$ was prepared by using the known short-net Yankee machine. Two pieces of this water-proof paper laid on top of the other were embossed by the steam match method.

Comparative Example 2

(Raw materials)

Rayon fibers, 1.5 d, 38 mm long.

PP/PP composite fiber (EP) of side-by-side type, 2 d, 45 mm long. These two kinds of fibers were used in a blending ratio of 70/30 by weight.

(Production of nonwoven fabric)

The above-mentioned fibers were made into a fiber-interlaced nonwoven fabric having a basis weight of 50 g/m², by using the step shown in FIG. 3(A) for mechanical interlacing by water jets.

The fiber-interlaced nonwoven fabric was heat-shrunk by the step shown in FIG. 3(B), so that the composite fibers shrank about 30% to give the same minute wrinkles 1a as shown in FIG. 2.

A single sheet of the heat-shrunk nonwoven fabric underwent evaluation. The fusion-bonding lines (2,2, . . . ) were not formed.

The number of rubbing cycles necessary for the surface of the sample to break is recorded. Incidentally, this test was performed on dry samples and wet samples (impregnated with a chemical solution).

The results of evaluation A are shown in Table 1.

TABLE 1

|  | Fiber (blending ratio) | Basis weight | Number of plies | Thickness | bending resistance (MD/CD) | Surface frictional strength (MD) (Dry/Wet) |
| --- | --- | --- | --- | --- | --- | --- |
| Embodiment 1 | Rayon/Shrinkable PP (70/30) wt % | 40 g/m² | X 2 | 1.7 mms | 98/55 | o/o (45/40) |
| Embodiment 2 | Rayon/Shrinkable PP (70/30) wt % | 25 g/m² | X 2 | 1.3 mm | 88/48 | o/o (38/36) |
| Embodiment 3 | Rayon/Shrinkable PP (70/30) wt % | 50 g/m² | X 2 | 2.0 mm | 110/62 | o/o (49/47) |
| Embodiment 4 | Rayon/PET (70/30) wt % | 40 g/m² | X 2 | 0.8 mm | 89/48 | o/o (48/42) |
| Comparative Example 1 | Water-proof paper (pulp 100%) | 40 g/m² | X 2 | 0.85 mm | 110/78 | x/x (15/3) |
| Comparative Example 2 | Rayon/Shrinkable PP (70/30) wt % | 50 g/m² | X 1 | 1.0 mm | 65/38 | x/x (18/14) |
| Comparative Example 3 | Rayon/Shrinkable PP (70/30) wt % | 20 g/m² | X 2 | 0.6 mm | 42/22 | x/x (24/20) |

Comparative Example 3

The same procedure as in Comparative Example 2 was repeated except that the fiber-interlaced nonwoven fabric had a basis weight of 20 g/m². The fiber-interlaced nonwoven fabric was heat-shrunk by the step shown in FIG. 3(B), so that the PP/PP composite fibers (of side-by-side type) shrank about 30%.

Two pieces of the heat-shrunk nonwoven fabric were fusion-bonded under the same conditions as in Embodiment 1, so that fusion-bonding lines (2,2, . . . ) were formed in a striped pattern as shown in FIG. 1.

The wiping sheet in Comparative Example 3 is the same in structure as those in above Embodiments but differs in the basis weight.

Evaluation A (Bending resistance)

Bending resistance was measured according to JIS (Japan Industrial Standard) L1096 (Cantilever method). This testing method consists of sliding a test piece (2.5 cm wide and 15 cm long) in its lengthwise direction on a horizontal support with its end inclined 45° until the end of the test piece touches the inclined surface. The distance (in mm) of sliding is recorded. The test pieces are cut in both the machine and cross directions.

(Surface frictional strength)

Surface frictional strength was measured by using a frictional tester (Type II) provided in JIS L-0823. This testing method consists of rubbing a white cotton cloth against a sample placed on a semicylindrical metal surface having a radius of curvature of 20 cm. The white cotton cloth, measuring 5 cm by 5 cm, is fixed on a head, measuring 2 cm by 2 cm and having a radius of curvature of 45 mm, so that there will be a contact area of about 1 cm². To perform the test, the head is moved back and forth (in the axial direction of the curvature) over a distance of 12 cm at a rate of 30 cycles per minute, with the head kept under a load of 500 g. The rubbing direction is parallel to the machine direction of the sample.

In Table 1 above, the surface frictional strength in the machine direction is expressed in terms of "o", "Δ", and "x", "601" indicating 30 or more cycles, "Δ" indicating 20–29 cycles, and "x" indicating less than 20 cycles.

It is noted from Table 1 that the samples of double wiping sheet in Embodiments 1 to 4 have a total thickness of 0.8 to 2.0 mm, which gives a good feel to hand at the time of wiping. In addition, it is also noted that these samples have a sufficiently high bending resistance owing to the fusion-bonding lines (2,2, . . . ) It was found that the samples are resistant to breakage due to the peeling of fibers from the surface of the nonwoven fabric and that the samples have a sufficiently high surface frictional strength.

The sample formed from two pieces of water-proof paper in Comparative Example 1 has a high bending resistance but is poor in surface frictional strength and is liable to break in both dry and wet state.

The sample formed from a single nonwoven fabric without fusion-bonding lines in Comparative Example 2 is poor both in bending resistance and surface frictional strength.

The sample in Comparative Example 3 is poor in both bending resistance and surface frictional strength because it has a small basis weight (20 g/m²) at one piece of nonwoven fabric and a total basis weight (40 g/m²) at two-ply, even though it has the same structure as Embodiments. In addition, it has a thickness of 0.6 mm, which gives a poor feel to hand at the time of wiping.

It is concluded from the foregoing that according to the present invention, the wiping sheet should have a total basis weight greater than 50 g/m² if it is composed of two nonwoven fabrics or the wiping sheet should have a basis weight of 50 g/m² if it is composed of a single nonwoven fabric. In either case, the total basis weight should be less than 100 g/m².

Evaluation B

Two pieces of heat-shrunk nonwoven fabrics in the same composition as in Embodiment 1 were prepared and pressed to form the fusion-bonding lines (2,2, . . . ) of the emboss pattern as shown in FIG. 4(A) and 4(B) under the same condition as in Embodiment 1. The pitch P (in the machine direction) of the fusion-bonding lines (2,2, . . . ) was 3 mm, 5 mm, 10 mm, 15 mm, and 20 mm. The effect of pitch on the performance of the wiping sheet was evaluated by using the same frictional tester (Type II) as used in Evaluation A mentioned above. This test was performed on wiping sheets impregnated with a chemical solution. The results are shown in Table 2.

TABLE 2

| Pitch of fusion-bonded parts | 3 mm | 5 mm | 10 mm | 15 mm | 20 mm |
|---|---|---|---|---|---|
| Surface frictional strength | ○ | ○ | ○ | ○ | Δ |
| Remarks | | poor in wiping effect | | | excessive surface fluffing |

In Table 2 above, the surface frictional strength is expressed in the same terms of "○" and "Δ" as in Table 1, "○" indicating 30 or more cycles and "Δ" indicating 20–29 cycles.

It is noted from Table 2 that the wiping sheet is subject to fluffing and poor in surface frictional strength if the pitch P (in the machine direction) of the fusion-bonding lines is 20 mm, or longer than one half of the length of rayon fiber (38 mm). This is because the fusion-bonding lines intersect (or hold) rayon fibers at only two points (on average) in the heat-shrunk nonwoven fabric.

In order to prevent fluffing (especially fluffing of other fibers than thermoplastic fibers), it is necessary to reduce the pitch P smaller than one half of the length of rayon fiber so that the fusion-bonding lines intersect the fiber at three or more points.

If the pitch of the fusion-bonding lines is 3 mm, the wiping sheet has a high surface frictional strength but the fusion-bonding lines account for a large surface area (and hence reduces the surface area of the non-fused region of the nonwoven fabric), which produces an adverse effect on the wiping effect. Therefore, the pitch of the fusion-bonding lines should be greater than 5 mm, or larger than one-eighth of the length of the fiber (other than thermoplastic fiber), and the fusion-bonding lines should intersect the fiber at 8 or less points.

As mentioned above, the wiping sheet of the present invention is formed by fusion-bonding nonwoven fabrics; therefore, it has a high bending resistance and a high surface frictional strength with good resistance to fluffing and breakage.

The wiping sheet permits effective cleaning regardless of the wiping direction owing to the fusion-bonding lines which are oblique to both the machine and cross directions.

The nonwoven fabric containing heat-shrunk fibers forms random wrinkles on the sheet surface which enhance the wiping effect.

What is claimed is:

1. A wiping sheet which comprises at least one nonwoven fabric formed by interlacing fibers containing at least thermoplastic fibers, said fibers being oriented more in the machine direction but less in the cross direction, said thermoplastic fibers being fusion-bonded such that the fusion-bonding lines extend forming a striped pattern in the direction intersecting the machine direction, said striped pattern having a pitch (in the machine direction) shorter than the substantial length of the fiber forming the nonwoven fabric.

2. The wiping sheet according to claim 1, wherein the nonwoven fabric has a tensile strength in the machine direction and a tensile strength in the cross direction in a ratio of from 1.5:1 to 10:1.

3. The wiping sheet according to claim 1, which comprises a plurality of nonwoven fabrics laid on top of the other and bonded together by said fusion-bonding lines.

4. The wiping sheet according to claim 1, wherein the fusion-bonding lines have parts extending obliquely to both the machine and cross directions.

5. The wiping sheet according to claim 4, wherein the fusion-bonding lines take on a wavy or herringbone pattern.

6. The wiping sheet according to claim 1, wherein the fusion-bonding lines have a pitch in the machine direction which is shorter than ½ and longer than ⅛ of the substantial length of fiber.

7. The wiping sheet according to claim 1, wherein the nonwoven fabric contains heat-shrinkable fibers.

8. The wiping sheet according to claim 1, wherein the wiping sheet comprises a single nonwoven fabric having a basis weight of 50 g/m$^2$ or above, or a plurality of nonwoven fabrics having a total basis weight of 50 g/m$^2$ or above.

9. A process for producing a wiping sheet which comprises the steps of forming a web containing heat-shrinkable fibers, interlacing the fibers constituting the web, shrinking said heat-shrinkable fibers in the web, and heat-fusing said thermoplastic fibers in the web using a heating roll, thereby forming fusion-bonding lines in a striped pattern such that the fusion-bonding lines extend crossing the machine direction and the striped pattern has a pitch in the machine direction which is shorter than the substantial length of the fibers constituting the nonwoven fabric, with the direction in which more fibers constituting the nonwoven fabric are oriented being defined as the machine direction and the direction (perpendicular to the machined direction) in which less fibers constituting the nonwoven fabric are oriented being defined as the cross direction.

10. The process for producing a wiping sheet according to claim 9, which further comprises, between the shrinking step and the fusion-bonding step, a step of laying a plurality of nonwoven fabrics on top of the other, so that they are bonded together by fusion-bonding lines in the fusion-bonding step.

11. The process for producing a wiping sheet according to claim 9, wherein the fusion-bonding lines are formed in a wavy or herringbone pattern.

12. The process for producing a wiping sheet according to claim 9, wherein the fusion-bonding lines have a pitch in the machine direction which is shorter than ½ and longer than ⅛ of the substantial length of fiber.

* * * * *